Aug. 2, 1932.                F. W. MERRICK                1,869,434
                          EDGE TRIMMER AND THE LIKE
                       Filed April 27, 1929      5 Sheets-Sheet 1
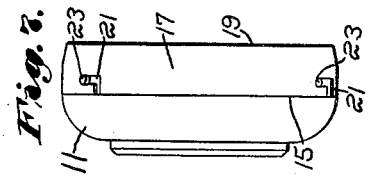
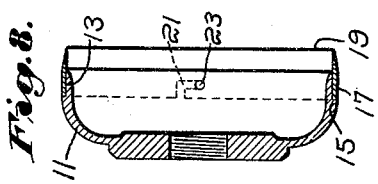
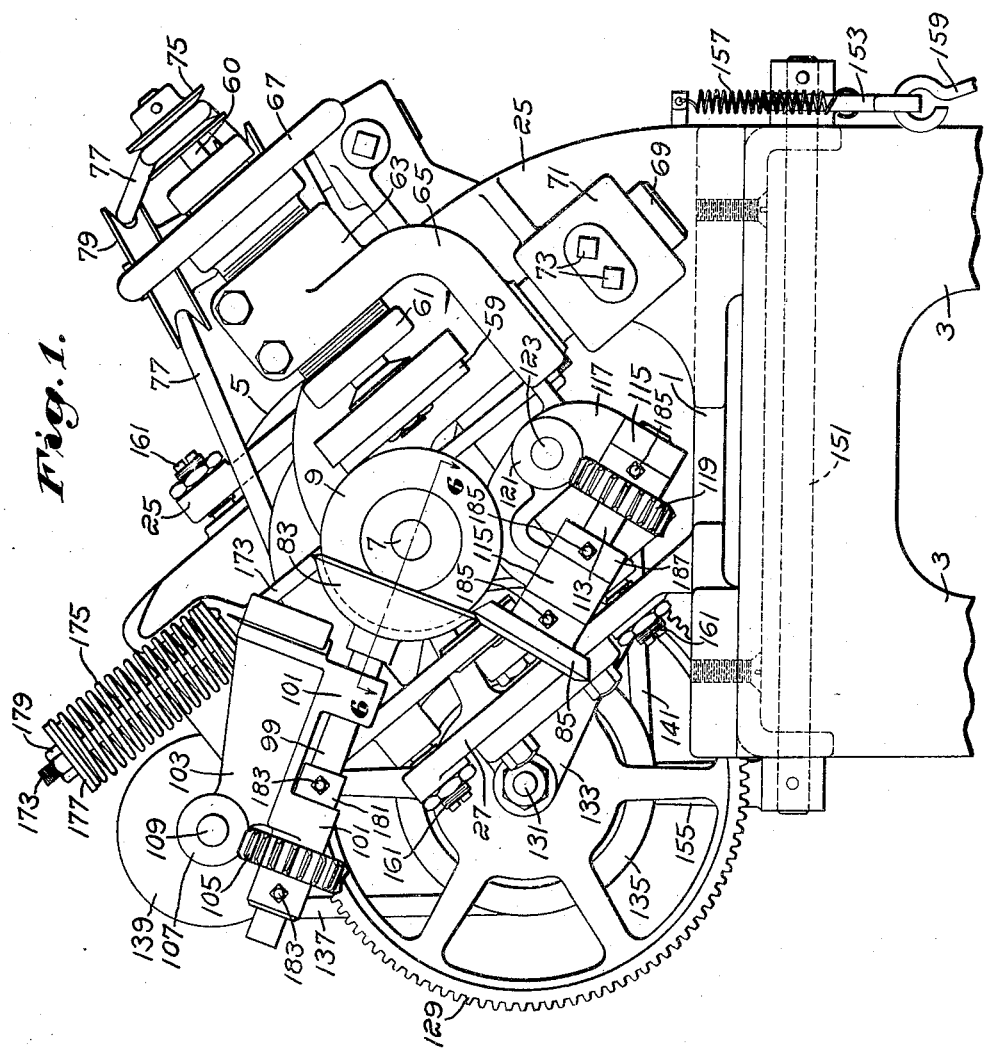
Inventor:
Frank W. Merrick,
by Emery, Booth, Varney & Townsend
Att'ys.

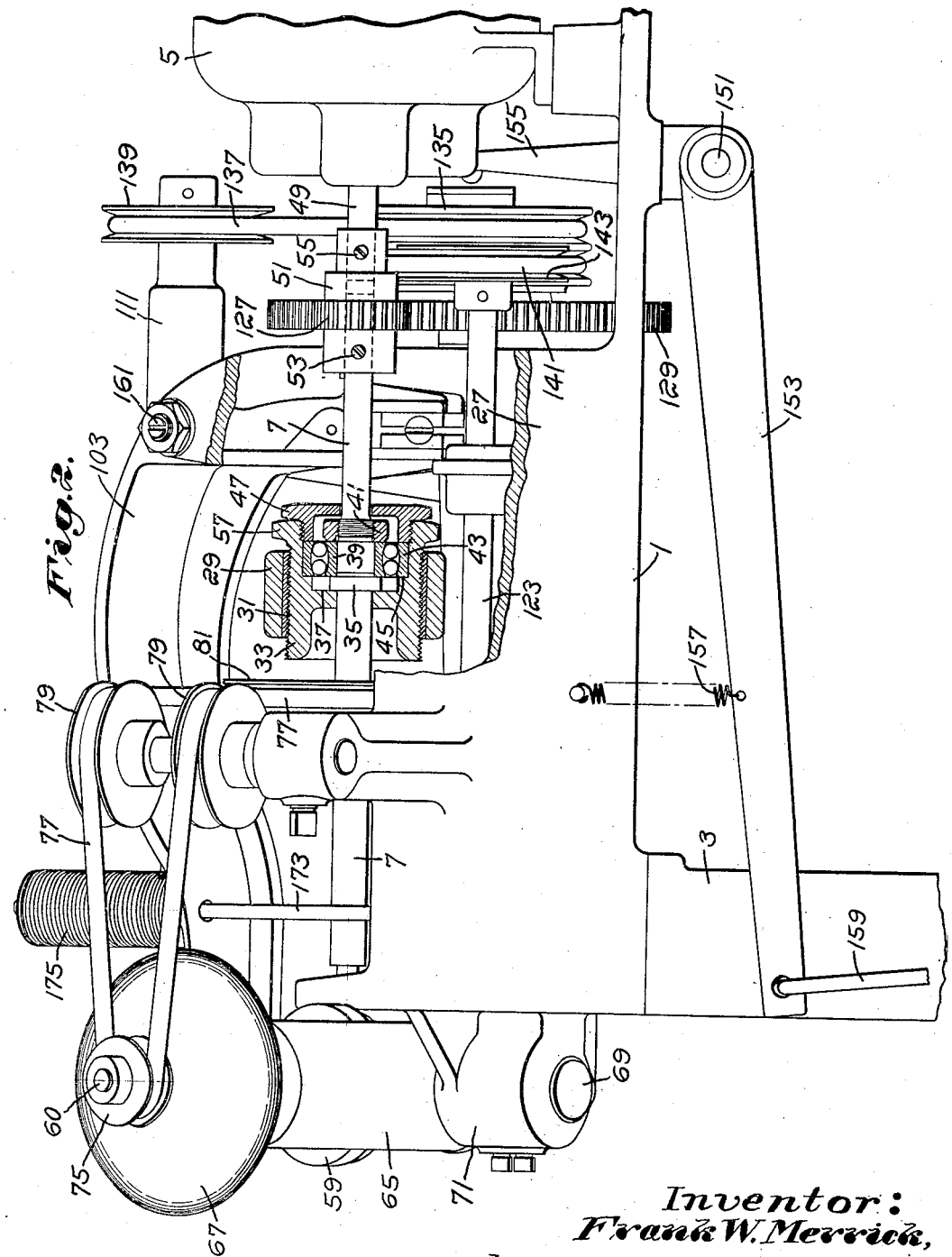

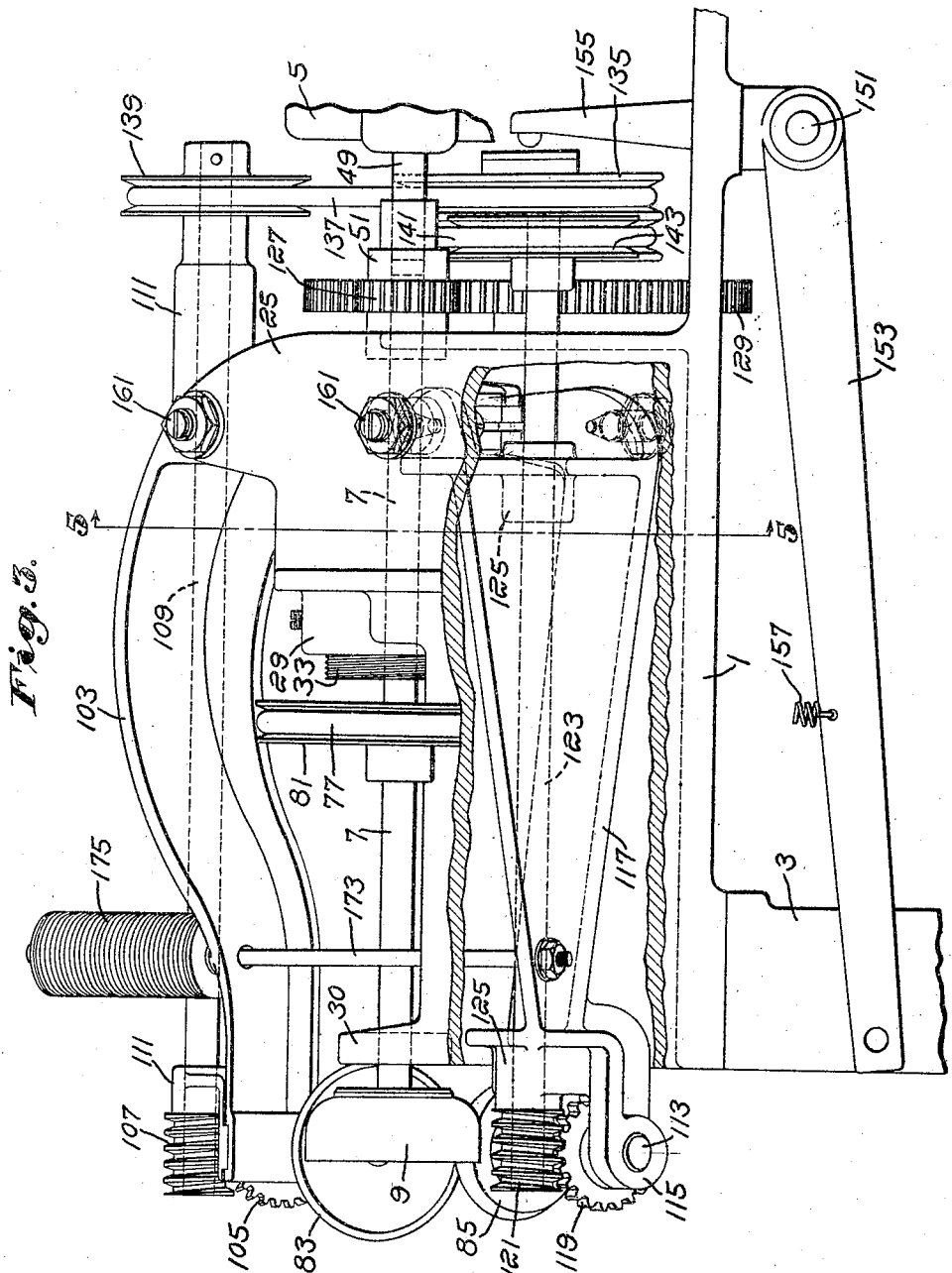

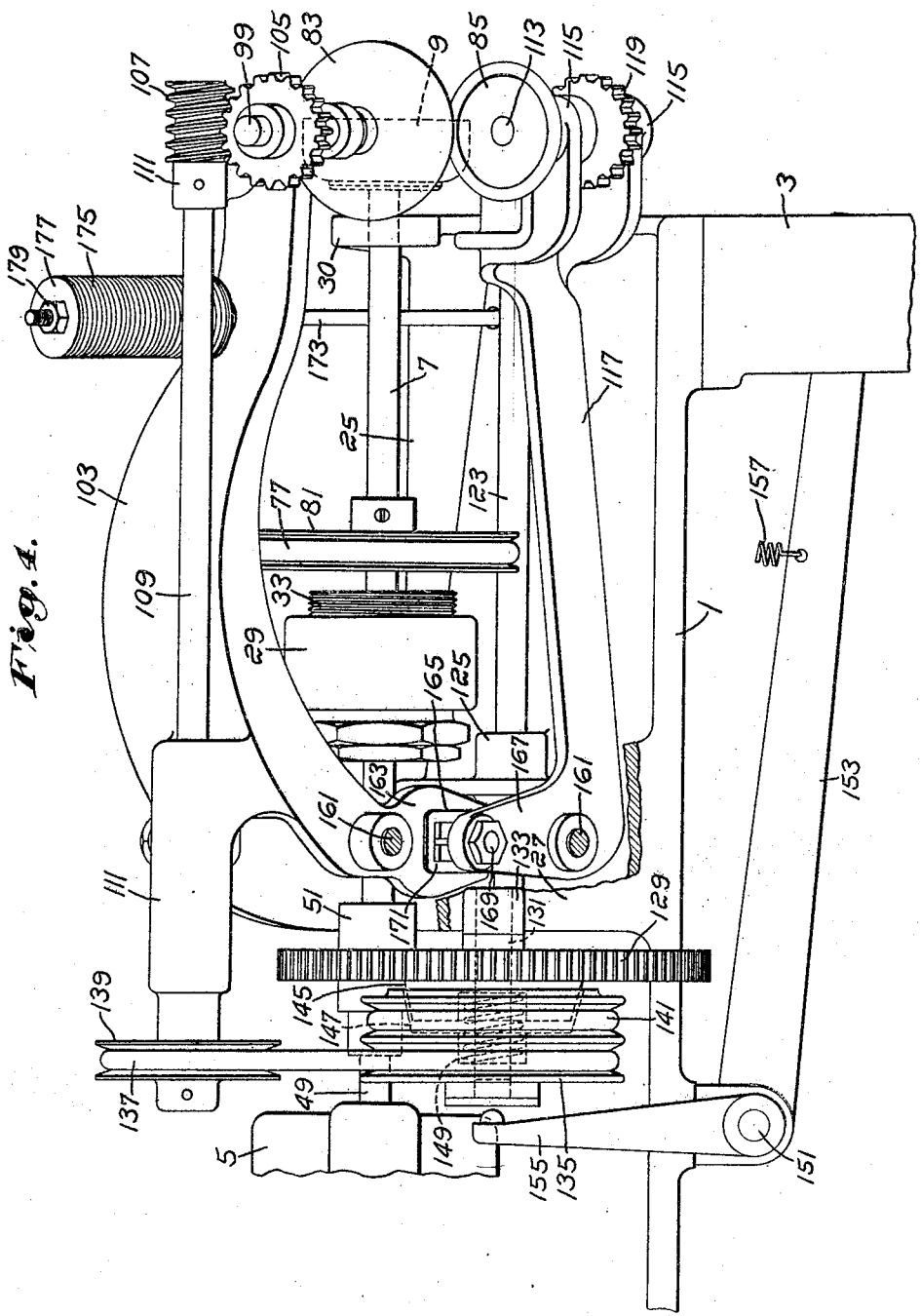

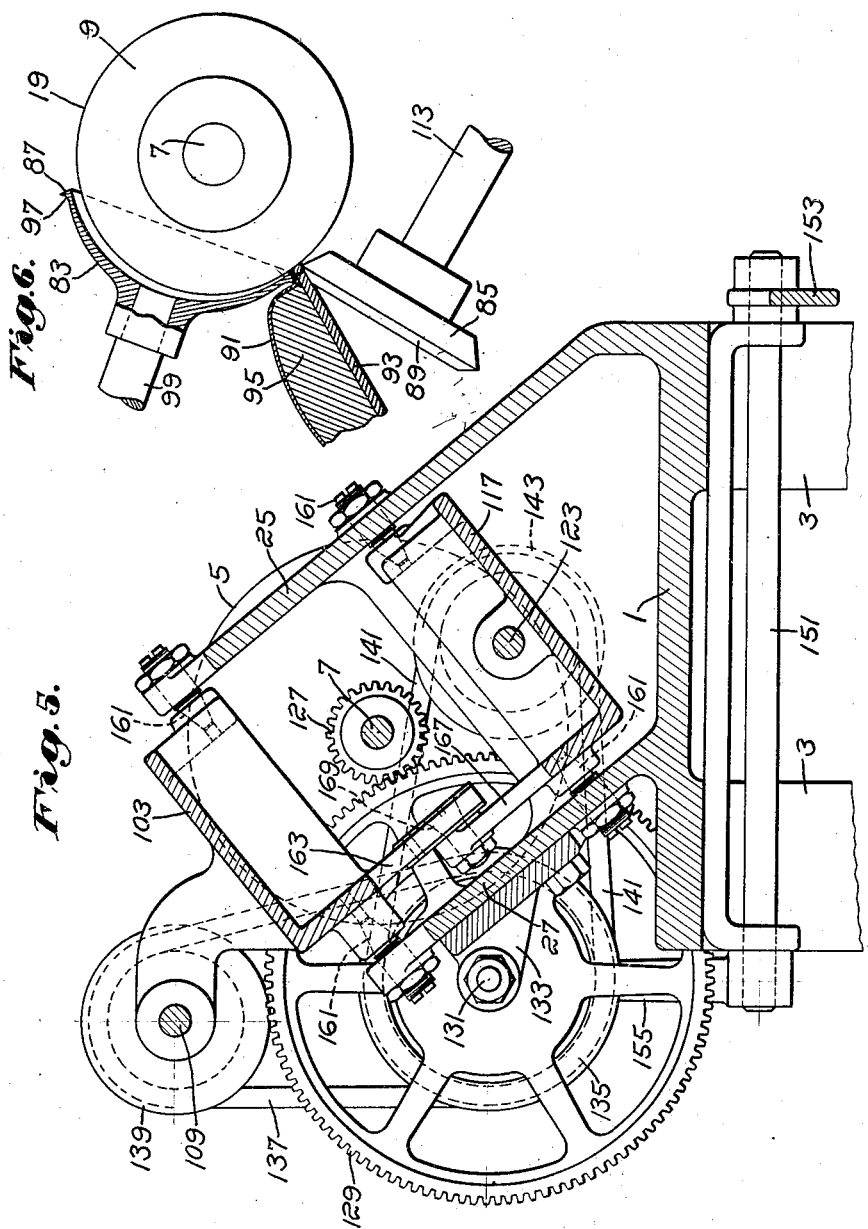

Patented Aug. 2, 1932

1,869,434

UNITED STATES PATENT OFFICE

FRANK W. MERRICK, OF DORCHESTER, MASSACHUSETTS

EDGE TRIMMER AND THE LIKE

Application filed April 27, 1929. Serial No. 358,644.

My invention relates to machines for trimming the edges of sheet material, as for example, an edge trimmer for shoes.

The invention will be best understood from the following description when read in the light of the accompanying drawings of one embodiment of the invention, while the scope of the invention will be more particularly pointed out in the appended claims.

In the drawings:—

Fig. 1 is an end elevation of a machine constructed according to the invention;

Figs. 2 and 3 respectively are side elevations of the machine looking at Fig. 1 from the right, with different parts broken away;

Fig. 4 is a side elevation of the machine looking at Fig. 1 from the left, with parts broken away;

Fig. 5 is a section on the line 5—5 of Fig. 3;

Fig. 6 is a section on the line 6—6 of Fig. 1; and

Figs. 7 and 8 are respectively a side elevation and a longitudinal section through a knife constructed according to the invention.

Referring to the drawings, I have shown a frame comprising a support 1 held in elevated position by legs 3. On the support is an electric motor 5 (Fig. 2) for driving a shaft 7, the latter at its end opposite the motor carrying a rotary knife 9.

Referring to Figs. 7 and 8, the knife may comprise a cup-shaped body member 11 which, adjacent its rim, is formed with the exteriorly reduced diameter portion 13 and a shoulder 15. Detachably carried by the reduced diameter portion 13 is a tubular member 17, one edge of the latter being formed to provide a cutting edge 19, while its opposite edge abuts the shoulder 15. As shown, the member 7 is provided with "bayonet" slots 21 cooperating with pins 23, the latter radially projecting from the reduced diameter portion 13 of the body member 11, this construction providing a "bayonet joint" connection between the members 11 and 17. If desired, the members 11 and 17 may be formed integrally, as indicated in Fig. 3.

As illustrated (see Figs. 2, 3 and 5), the support 1 has upstanding portions 25 and 27, the former of which carries a boss 29 having, at an intermediate portion of the shaft 7, an adjustable thrust bearing for said shaft. Adjacent the knife 9 the bracket 30 carried by the support 1 provides a forward end bearing for the shaft 7. As illustrated (see Fig. 2), the boss 29 is perforated, and interiorly of the perforation carries an internally screw threaded sleeve 31 which receives the exteriorly screw threaded thrust bearing block 33. Herein the shaft 7 is provided with an integral thrust collar 35 which, at one side thereof, cooperates with the surface 37 of the block 33, while abutting the opposite side of the collar is the internal member 39 of a ball bearing, said member 39 surrounding the shaft and being clamped against the collar 35 by a nut 41 screw threaded on the shaft. The external member 43 of the ball bearing is clamped against the shoulder 45 of the block 33 by a nut 47.

As shown, the shaft 7 is secured to the armature shaft 49 of the motor 5 by a coupling sleeve 51, into which sleeve adjacent ends of the shafts 7 and 49 project, said ends of said shafts preferably being splined to said sleeve. Longitudinal movement between the coupling member and the shafts is normally prevented by set screws 53 and 55. By loosening the set screw 53, and turning the adjusting block 33, the latter of which conveniently for this purpose is provided with a portion 57 for engagement with a wrench, the shaft 7 may be adjusted longitudinally for suitably positioning the knife, after which the set screw 53 may again be tightened to secure the knife in adjusted position.

As illustrated (see Fig. 1), cooperating with the cutting edge of the knife is a disk grinder 59, the shaft 60 of which is mounted for rotation in a bearing bushing 61 screw threaded for longitudinal adjustment in the boss 63 of a bracket 65, the bearing bushing 61 at the end thereof opposite the grinder having a handwheel 67 for effecting this adjustment. Conveniently the bracket 65 may have a cylindrical arm 69 which is rotatable and longitudinally adjustable in a perforated boss 71, the latter carried by the upstanding portion 25 of the support 1. Set screws 73, or other suitable clamping devices, are provided for securing the arm 69 in its adjusted positions so as to afford further means for adjusting the disk grinder 59 relative to the knife. As illustrated, the shaft 60 of the disk grinder carries a grooved pulley 75 (Figs. 1 and 2) about which passes a resilient belt 77, said belt passing over the two guide pulleys 79 to a driving pulley 81 on the shaft 7, so that when the knife is rotated the grinder will be rotated.

As illustrated, cooperating with the knife 9 is a pair of rotary presser members 83 and 85 (see Figs. 1, 3 and 6) for guiding and feeding the work to the cutting edge of the knife. As illustrated (Fig. 6), the presser member 83 is cup-shaped and partially encloses the knife so as to act as a shield therefor, which protects the work and the hands of the operators from the knife. As clearly illustrated in Fig. 6, the presser member 83 at its rim has a beveled face 87 cooperating with the beveled face 89 at the periphery of the presser member 85, so that when said presser members are rotated in opposite directions the work will be guided and fed to the cutting edge of the knife. In Fig. 6 the work is illustrated as a shoe having the uppers 91 and sole 93 both carried by a last 95, the shoe being in the process of being fed and guided to the cutting edge of the knife for trimming the edge of the sole. As shown, the exterior of the cup-shaped presser member 83 adjacent the rim thereof is recessed, as at 97, to permit the sole of the shoe, at the shank and at other outwardly swelling portions of the uppers, to be brought into proper relation with the cutting edge of the knife.

Herein the presser member 83 is secured to the end of a shaft 99 rotatably mounted in bearings 101 carried on the end of a lever member 103 (Figs. 1, 3 and 4), the shaft 99 being provided with a worm wheel 105 driven by a worm 107, which latter is carried on the end of a shaft 109 rotatably supported in bearings 111 on the lever member 103. Similarly, the presser member 85 is mounted on the end of a shaft 113 rotatably mounted in bearings 115 (Figs. 1 and 4) on a lever member 117, the shaft 113 being provided with a worm wheel 119 (Figs. 1, 3 and 4) driven by a worm 121, which latter is secured to the end of a shaft 123 carried in bearings 125 on said lever member 117.

As illustrated, the coupling sleeve 51, connecting the armature shaft 49 to the shaft 7, forms the hub of a pinion 127 in mesh with a gear 129, the latter journaled on a spindle 131 (Fig. 4) projecting from a bracket 133 secured to the upstanding member 27 of the support 1, so that said gear will be rotated when the knife is rotated. As shown, the spindle 131 loosely carries for rotation thereon a double grooved pulley 135. A belt 137 passes around this pulley and the grooved pulley 139 on the end of the shaft 109, which latter drives the presser member 83, while a second belt 141 passes around the pulley 135 and a grooved pulley 143 (Figs. 3 and 5) on the end of the shaft 123, which latter drives the presser member 85. As shown (Fig. 4), the gear 129 is provided at the side thereof adjacent the double pulley 135 with an exteriorly conical hub 145 fitting into a conical socket 147 formed in the pulley 135, so as to provide a clutch, the clutch being normally held in disengaged position by the spring 149. Conveniently for actuating the clutch I have herein provided a bell crank lever comprising a rock shaft 151 carried by the support 1 and having secured thereto at opposite ends the arms 153 and 155. Normally the bell crank lever is held in the position of parts shown by Fig. 4 (in which position of parts the clutch is disengaged) by a spring 157, the latter secured at one end to the arm 153 and at its opposite end to the support 1. Conveniently, the bell crank lever is operated by a foot pedal, not shown, connected to the free end of the arm 153 by a link 159, so that when the foot pedal is depressed the clutch will be engaged by the arm 155 pushing the pulley 135 to the right as viewed in Fig. 4, and when the pressure of the foot is removed from the foot pedal, the spring 157 will raise the arm 153 to swing the arm 155 to the left as viewed in Fig. 4 for permitting the spring 149 to disengage the clutch. Obviously, when the clutch is engaged and the motor 5 is in operation, the presser members 83 and 85 are rotated to feed the work to the cutting edge of the rotating knife.

Herein the lever members 103 and 117 are fulcrumed on pivots 161 carried at opposite sides thereof by the upstanding members 25 and 27 of the support 1, so that the presser members may be separated and brought together to receive and grip the work. For equalizing the movements of the lever members 103 and 117, the member 103 is provided with a downwardly projecting arm 163 (Fig. 4) so formed as to provide a slot 165, while the member 117 is provided with an upwardly projecting arm 167 having near the end thereof a pin 169 which carries a block 171 pivoted on the pin and sliding in the slot 165.

For yieldingly forcing the presser members toward each other, the same near their free ends are provided with a tension device (see Figs. 3 and 4) which herein comprises a rod 173 and a coil spring 175. The rod 173 at its lower end is loosely secured to the lever 117, and, at its opposite end, loosely extends through a perforation in the lever 103, and at the upper side of said lever is surrounded by the spring 175. The lower end of the spring 175 bears against the upper side of the lever 103, while a washer 177 and a nut 179, both carried by the adjacent end portion of the rod 173, serve to place the spring under compression.

Conveniently, the belts 137 and 141 for driving the two presser member shafts 109 and 123 may be longitudinally resilient, as for example, they may be formed of elastic rubber. By placing these belts under slight initial tension they will remain tight on their respective pulleys as said pulleys are swung away from or toward the driving pulley 135 when the levers 103 and 117 are moved on their fulcrums.

In operating the machine, the width of the trimmed edge of the sole may be varied by adjusting the presser member 83, or, if necessary, both this member and the presser member 85, transversely relative to the cutting edge of the knife. Herein, for this purpose (see Fig. 5), the pivots 161, on which are fulcrumed the lever members 103 and 117, the latter carrying the presser members, are screw threaded into the upstanding members 25 and 27 of the support 1. By "backing off" the pivots in one of the upstanding members, say those in the member 25, and "tightening" the pivots in the opposite member, in this case the member 27, the lever members may be moved toward the axis of the knife. Conversely, by "backing off" the pivots in the member 27 and "tightening" the pivots in the member 25 the lever members may be moved away from the axis of the knife.

For varying the angle between the trimmed edge of the sole and the knife, so that said edge may be trimmed "square", or be more or less beveled, as desired, provision has been made in the machine illustrated for adjusting the presser members axially. As shown, for this purpose the worm gear 105 and collar 181 on the shaft 99, which latter carries the presser member 83, are secured to said shaft by set screws 183. In an obvious manner by use of said set screws, the shaft 99 may be adjusted axially for moving the presser member toward or away from the knife, the worm wheel and collar, which abut opposite ends of the adjacent bearing 101 for the shaft, holding the shaft from axial movement when the associated set screws are tightened. Similarly the shaft 113, which carries the presser member 85, may be adjusted axially by providing set screws 185 which secure said presser member, the collar 187 and worm wheel 119 to said shaft.

As the cutting edge of the knife wears, obviously the knife may be adjusted axially by the hereinbefore described thrust bearing block 33. Otherwise, proper relation between the grinder 59 and the knife is maintained by the hereinbefore described adjustable support for said grinder.

It will be understood that wide deviations may be made from the embodiment of the invention herein described, without departing from the spirit of the invention.

I claim:

1. In a machine of the character described, a rotary knife having at its rim a cutting edge which is adapted to cut through planes at right angles to the axis of rotation of said knife, a pair of cooperating presser members for guiding the work relative to said cutting edge, one of said presser members being cup-shaped and partially surrounding said knife so as to act as a shield for the latter, the axis of said presser member disposed transversely to the axis of rotation of said knife, said presser member having a rim portion for engaging one side of the work, the other presser member having a peripheral portion for engaging the opposite side of the work, said presser members being so disposed that both are between said knife and the body of the work when the edge of the latter is presented to said cutting edge, means for yieldingly urging said presser members toward each other, and means for simultaneously rotating said presser members in opposite directions for feeding the work toward said cutting edge.

2. A machine of the character described having, in combination, a rotary knife, a pair of rotary presser members for guiding the work relative to the cutting edge of said knife, and mechanism including rotary driving shafts carrying said presser members operative yieldingly to move both simultaneously and coordinately toward or away from each other.

3. A machine of the character described having, in combination, a rotary knife, a pair of presser members for guiding the work relative to the cutting edge of said knife, said presser members having cooperating work engaging portions at one side of said cutting edge, and mechanism including rotary driving shafts carrying said presser members operative yieldingly to move both simultaneously and coordinately toward or away from each other.

4. A machine of the character described having, in combination, a rotary knife, a pair of presser members for guiding and feeding the work relative to the cutting edge of said knife, supports for said presser members, and driving means for said presser members carried by said supports, said supports being mounted for moving said presser members simultaneously and coordinately toward or away from each other.

5. A machine of the character described having, in combination, a rotary knife, a pair of presser members for guiding and feeding the work relative to the cutting edge of said knife, supports for said presser members, driving means for said presser members carried by said supports, said supports being mounted for moving said presser members toward or away from each other, and means causing said supports to move simultaneously.

6. A machine of the character described having, in combination, a rotary knife, a pair of presser members for guiding and feeding the work relative to the cutting edge of said knife, driving means for said presser members, a pair of lever members respectively carrying the respective presser members and the respective driving means for said presser members, said lever members mounted for moving said presser members toward or away from each other, and means for causing said lever members to move simultaneously.

7. A machine of the character described having, in combination, a rotary knife, a pair of presser members for guiding and feeding the work relative to the cutting edge of said knife, driving means for said presser members, a pair of lever members respectively carrying the respective presser members and the respective driving means for said presser members, said lever members mounted for moving said presser members toward or away from each other, means for causing said lever members to move simultaneously, a single driving means for rotating said knife and actuating said driving means for said presser members, and clutch mechanism for controlling the actuation of said driving means for said presser members.

8. A machine of the character described having, in combination, a rotary knife, a pair of cooperating rotary presser members, driving means for said presser members, a pair of supports respectively carrying the respective presser members and the respective driving means for said presser members, said supports being movable for moving said presser members relative to the cutting edge of said knife, means enforcing simultaneous coordinated movement of said supports, a driving shaft for said knife, and means for actuating said driving means for said presser members from said shaft.

9. A machine of the character described having, in combination, a rotary knife, a pair of cooperating rotary presser members, driving means for said presser members, a pair of supports respectively carrying the respective presser members and the respective driving means for said presser members, said supports being movable for moving said presser members relative to the cutting edge of said knife, means enforcing simultaneous coordinated movement of said supports, a driving shaft for said knife, means for actuating said driving means for said presser members from said shaft, and clutch mechanism for controlling the actuation of said driving means for said presser members.

10. In a machine of the character described, a rotary knife the cutting edge of which is adapted to cut through planes at right angles to its axis of rotation, and a rotary grinder for said cutting edge, said grinder having support means for adjustably tilting the working face of said grinder relative to said knife and for independently of such tilting adjustably positioning said grinder transversely to the axis of said knife in each of two directions transverse to said axis.

11. A machine of the character described having, in combination, a rotary knife the cutting edge of which is adapted to cut through planes at right angles to its axis, and a pair of cooperating presser members disposed exteriorly of the cylindrical surface which contains said cutting edge, said presser members having work-engaging faces adapted to contact with opposite sides of the work adjacent said cutting edge along lines which are generally radial to said knife.

12. A machine of the character described having, in combination, a rotary knife the cutting edge of which is adapted to cut through planes at right angles to its axis, a pair of cooperating presser members disposed exteriorly of the cylindrical surface which contains said cutting edge, said presser members having work-engaging faces adapted to contact with opposite sides of the work adjacent said cutting edge along lines which are generally radial to said knife, and means for adjusting said knife axially.

13. A machine of the character described having, in combination, a rotary knife the cutting edge of which is adapted to cut through planes at right angles to its axis, and a pair of cooperating rotary presser members having annular work-engaging faces adapted to contact with opposite sides of the work along lines which are generally radial to the knife, said presser members being disposed between said knife and the work.

14. A machine of the character described having, in combination, a rotary knife the cutting edge of which is adapted to cut through planes at right angles to its axis, a pair of cooperating rotary presser members having annular work-engaging faces adapted to contact with opposite sides of the work along lines which are generally radial to the knife, said presser members being disposed between said knife and the work, and one of said presser members having a cavity for receiving a segmental portion of said knife.

15. A machine of the character described having, in combination, a rotary knife the cutting edge of which is adapted to cut through planes at right angles to its axis, a pair of cooperating rotary presser members having annular work-engaging faces adapted to contact with opposite sides of the work along lines which are generally radial to the knife, said presser members being disposed between said knife and the work, and one of said presser members having a cavity for receiving a segmental portion of the cutting edge of said knife, the axis of the last named presser member being substantially in a plane which includes the axis of said knife.

16. A machine of the character described having, in combination, a rotary knife the cutting edge of which is adapted to cut through planes at right angles to its axis, a pair of cooperating rotary presser members having annular work-engaging faces adapted to contact with opposite sides of the work along lines which are generally radial to the knife, said presser members being disposed between said knife and the work, and one of said presser members having a cavity for receiving a segmental portion of the cutting edge of said knife, the axis of the last named presser member being substantially normal to the axis of said knife.

17. In a machine of the character described, a rotary knife having at its rim a cutting edge which is adapted to cut through planes at right angles to the axis of rotation of said knife, a pair of cooperating presser members for guiding the work relative to said cutting edge, one of said presser members partially surrounding said knife and having its axis disposed transversely to the axis of rotation of said knife, said presser member having a rim portion for engaging one side of the work, the other presser member having a rim portion for engaging the opposite side of the work, and both of said rim portions presenting annular work-engaging surfaces which contact with the work along lines generally radial to said knife.

In testimony whereof, I have signed my name to this specification.

FRANK W. MERRICK.